US012497520B2

(12) United States Patent
Klemic et al.

(10) Patent No.: US 12,497,520 B2
(45) Date of Patent: Dec. 16, 2025

(54) NON-INJURIOUS INCAPACITATING DEVICE AND METHOD OF USE THEREOF

(71) Applicant: Softball Security Systems, LLC, Annandale, VA (US)

(72) Inventors: James Frank Klemic, Annandale, VA (US); Ravindra Anant Athale, Annandale, VA (US)

(73) Assignee: Softball Security Systems, LLC, Annandale, VA (US)

( * ) Notice: Subject to any disclaimer, the term of this patent is extended or adjusted under 35 U.S.C. 154(b) by 143 days.

(21) Appl. No.: 17/894,456

(22) Filed: Aug. 24, 2022

(65) Prior Publication Data

US 2022/0404125 A1 Dec. 22, 2022

(51) Int. Cl.

| | |
|---|---|
| ***F41H 13/00*** | (2006.01) |
| ***C09D 4/00*** | (2006.01) |
| ***C09D 7/00*** | (2018.01) |
| ***C09D 7/63*** | (2018.01) |
| ***F41H 9/04*** | (2006.01) |

(52) U.S. Cl.

CPC ................. *C09D 7/63* (2018.01); *C09D 4/00* (2013.01); *C09D 7/00* (2013.01); *F41H 9/04* (2013.01); *F41H 13/0006* (2013.01)

(58) Field of Classification Search

CPC .......... F41H 13/006; F42B 6/00; F42B 12/36; F42B 12/00

See application file for complete search history.

(56) References Cited

U.S. PATENT DOCUMENTS

| | | | | |
|---|---|---|---|---|
| 5,649,466 | A * | 7/1997 | Genovese .......... | B64D 45/0036 102/293 |
| 5,965,839 | A | 10/1999 | Vasel et al. | |
| 6,223,658 | B1 | 5/2001 | Rosa et al. | |
| 6,373,384 | B1 | 4/2002 | Ferguson et al. | |
| 7,752,974 | B2 | 7/2010 | Wenaas et al. | |
| 8,757,039 | B2 * | 6/2014 | Martinez .................. | B63G 9/04 404/6 |
| 10,036,615 | B2 | 7/2018 | Norris et al. | |
| 2011/0101097 | A1 * | 5/2011 | Olden ................... | F42C 11/002 235/404 |
| 2016/0363422 | A1 * | 12/2016 | Young ................. | F41H 13/0006 |

* cited by examiner

*Primary Examiner* — J. Woodrow Eldred

(74) *Attorney, Agent, or Firm* — MaxGoLaw PLLC

(57) ABSTRACT

A non-injurious incapacitating device is provided that includes an exterior layer defining a contained volume. A primary effect is contained within the device that deploys to size at least 10 times that of the contained volume. A power supply and a sensor are provided. The sensor communicates a contact or proximity signal when the exterior layer contacts or is within an effective range of a target. A control circuit interconnects provides a triggering signal to the primary effect based on the contact or proximity signal. The device is provided in some embodiments as a system inclusive of a launcher. A method of non-injuriously incapacitating of a target individual is also provided in which a user directs a device into proximity of the target individual. The device deploys an expansive primary effect to non-injuriously incapacitate the target individual.

19 Claims, 8 Drawing Sheets

E

NON-INJURIOUS INCAPACITATING DEVICE AND METHOD OF USE THEREOF

RELATED APPLICATION DATA

This application claims priority U.S. Provisional Application No. 63/236,349, filed Aug. 24, 2021, the entire disclosure of which is hereby incorporated by reference as if set forth fully herein.

FIELD OF THE INVENTION

The present invention relates in general to incapacitating an individual and in particular to devices, systems, and methods inclusive thereof to delay, disrupt, distract, or degrade the ability of a target individual, to cause harm to others or themselves, and additionally designate the target individual for subsequent identification without causing any direct physical harm to the target individual.

BACKGROUND

The unique history of guns in the US as exemplified by the Second Amendment to the constitution has caused it to lead the world in gun violence (NYT Article "Why Does the U.S. Have So Many Mass Shootings? Research Is Clear: Guns.", By Max Fisher and Josh Keller, Nov. 7, 2017). Deaths due to guns come in many forms; ancillary to other crimes such as robberies or drug deals, suicides, crimes of passion, by security personnel and mass killing in public places. It is the last two categories that make a particularly deep impact on the society when the victims are unarmed in the case of police shooting or when a mass killing happens in a place commonly considered safe (e.g., school, church, shopping centers) and when the victims are particularly vulnerable members of the society (e.g., students, children, worshippers, families going about their daily lives). After a particularly horrific incidence, the public reactions have become so predictable as to be scripted: offer thoughts and prayers to the victims and their families; one group demanding stricter gun control; another group demanding arming the public at-large to stop "the bad guy"; and the gun control lobby decrying the politicization of tragedies.

The standard direction in order of priority in the event of a mass shooting has been "run, hide, fight" where fight is the option deployed when the first two actions are not available or when the victim is cornered. A more proactive and hopeful, though tragic, twist to the mass shooting stories has started emerging. When facing a mass shooter, persons from the threatened group attacks the shooter often stopping the shooter but only at the expense of their own lives. A column in the Washington Post was titled "Students who charge shooters are heroes. It's shameful they're martyrs, too." Elizabeth Bruenig, May 9, 2019.

Recent incidents of mass shootings, especially in schools have led to companies and institutions offering defensive technologies ranging from what would be laughable, if it were not so tragic, (giving students hockey pucks) to somewhat questionable (pepper spray discharged from a device the size of a fire extinguisher). The efficacies of these approaches, greater exposure to risk when using them, and potential counter measures that the perpetrator can easily employ have been problematic aspects of these solutions.

The situations described above also has another class of individuals who work in the places enumerated above. They face this danger every single workday from noncooperative and hostile individuals as well psychopaths who are intent on mass killing. This class consists of (i) teachers and other workers in educational institutes, (ii) staff working in mental health institutes and social work organizations, (iii) service employees in bars, entertainment arenas or other places of commerce, (iv) places of worship. Furthermore, these workers are not permitted to carry tools for self-defense either for personal moral reasons or by law. Hence, when faced with such a threat, their only recourse is to call 911 for law enforcement or other security service professionals.

These professionals, who can be called the zeroth responders to contrast with security personnel referred to as the first responders, can provide immediate action that can limit the damage before the first responders arrive. They can be better prepared than ordinary citizens going about their lives. A non-injurious technology outlined in this invention can help them protect themselves and others who are conducting business at the establishments where the zeroth responders work.

A new element has been recently added to this already grim situation: law enforcement officers shooting unarmed civilians in an apparently unjustified manner (especially when viewed in slow motion from multiple different angles without any stress of facing a life-threatening situation). Again, the proposed reactions follow predictable scripts and range from demonstrations including riots, investigations that many times find the officers not guilty of any crimes followed by more demonstrations and possibly riots. To this is added another slogan of "Defunding the Police."

The challenge of providing alternatives to "lethal force" for use by security personnel has been recognized and researched over a long period. Some of the technologies geared towards crowd control include tear gas, high pressure water from the fire hose, pepper sprays, high brightness flashing lights, high intensity microwave radiation. These solutions are termed "non-lethal" which implies that they are intended to cause physical pain that is below the threshold of causing death.

In a document published on National Institute of Justice website on Aug. 3, 2009, the following continuum for use of force escalation is described:

Stage 1 Officer Presence—No force is used. Considered the best way to resolve a situation. The mere presence of a law enforcement officer works to deter crime or diffuse a situation. Officers' attitudes are professional and nonthreatening.

Stage 2 Verbalization—Force is not-physical. Officers issue calm, nonthreatening commands, such as "Let me see your identification and registration." Officers may increase their volume and shorten commands in an attempt to gain compliance. Short commands might include "Stop," or "Don't move."

Stage 3 Empty-Hand Control—Officers use bodily force to gain control of a situation. Soft technique: Officers use grabs, holds and joint locks to restrain an individual. Hard technique: Officers use punches and kicks to restrain an individual.

Stage 4 Less-Lethal Methods—Officers use less-lethal technologies to gain control of a situation.

a. Blunt impact. Officers may use a baton or projectile to immobilize a combative person.

b. Chemical. Officers may use chemical sprays or projectiles embedded with chemicals to restrain an individual (e.g., pepper spray).

c. Conducted Energy Devices (CEDs). Officers may use CEDs to immobilize an individual. CEDs discharge a high-voltage, low-amperage jolt of electricity at a distance.

Stage 5 Lethal Force—Officers use lethal weapons to gain control of a situation. Should only be used if a suspect poses a serious threat to the officer or another individual. Officers use deadly weapons such as firearms to stop an individual's actions.

It should be noted that beyond Stage 2—"Verbalization"—and before the deployment of lethal or non-lethal force, the officer must engage in close-in interaction with the individual of interest. Since it is not often known whether that individual is armed with any kind of weapon, more often than not, the office asks the individual of interest to show hands, lie on the ground or lean against the car or wall facing the wall with legs spread. These positions are designed to preclude rapid hostile actions by the individual against the officer when the officer approaches the individual for hands-on inspection. When the individual is not fully compliant either because of mental incapacity or drug use or illness or bad intents, the officers are quickly led to deploy options in Stage 4—"Less-Lethal Methods"—which are manifestly harmful to the individual, thus escalating the situation tragically leading in some cases to Stage 5, deploying lethal force.

One recent technology geared towards law enforcement personnel has been the BOLAWRAP® (Wrap Technologies) which can be deployed from a safe distance and is effective for restraining a suspect by entangling his legs in thin but strong wires thereby immobilizing the suspect. Such a device has not yet been offered for sale outside the law enforcement agencies.

Another related technology goes under the name of "Net Guns". This technology uses a device resembling a gun and contains a net (like a fishing net) that is folded and stoved in the barrel. A burst of compressed air propels the folded net towards the target (an individual or an animal). The net unfolds during its propagation towards the target and drapes it thereby entangling it. Such a device was primarily developed as a humane way of capturing wild or stray animals and has limited use against human targets.

Gun ownership is also defended on the basis of security against intruders in your home. However, in order prevent accidental deaths, it is also recommended that the bullets should be removed from the gun before storing it in a locked cabinet. This safety precaution makes the gun virtually useless in case of an intruder breaking in the home, typically in the middle of the night and waking up the owner. In order for the gun to be readily available for self-defense, the gun owner needs to develop a new bedtime ritual that includes, in addition to brushing teeth, retrieving the gun from the cabinet, loading it and keeping it by the bedside and then reverse the steps after waking up and brushing the teeth. This is clearly unrealistic.

Thus, there exists a need for a device that can be deployed with limited training to incapacitate a target individual in a non-injurious manner. There further exists a need for a device amenable to being deployed with minimal risk to the operator.

SUMMARY OF THE INVENTION

A non-injurious incapacitating device is provided that includes an exterior layer defining a contained volume. A primary effect is contained within the volume that deploys to size at least 10 times that of the contained volume. A power supply and a sensor are provided. The sensor communicates a contact or proximity signal when the exterior layer contacts or is within an effective range of a target. A control circuit interconnects provides a triggering signal to the primary effect based on the contact or proximity signal. The device is provided in some embodiments as a system inclusive of a launcher.

A method of non-injuriously incapacitating a target individual is also provided in which a user directs a device into proximity of the target individual. The device deploys an expansive primary effect from within the contained volume to non-injuriously incapacitate the target individual.

BRIEF DESCRIPTION OF THE DRAWINGS

The present invention is further detailed with respect to the following figures that depict various aspects of the present invention.

FIG. 3D is a partial cutaway, magnified view of the inventive device of FIG. 3A;

DETAILED DESCRIPTION OF THE PREFERRED EMBODIMENTS

Figure 1:
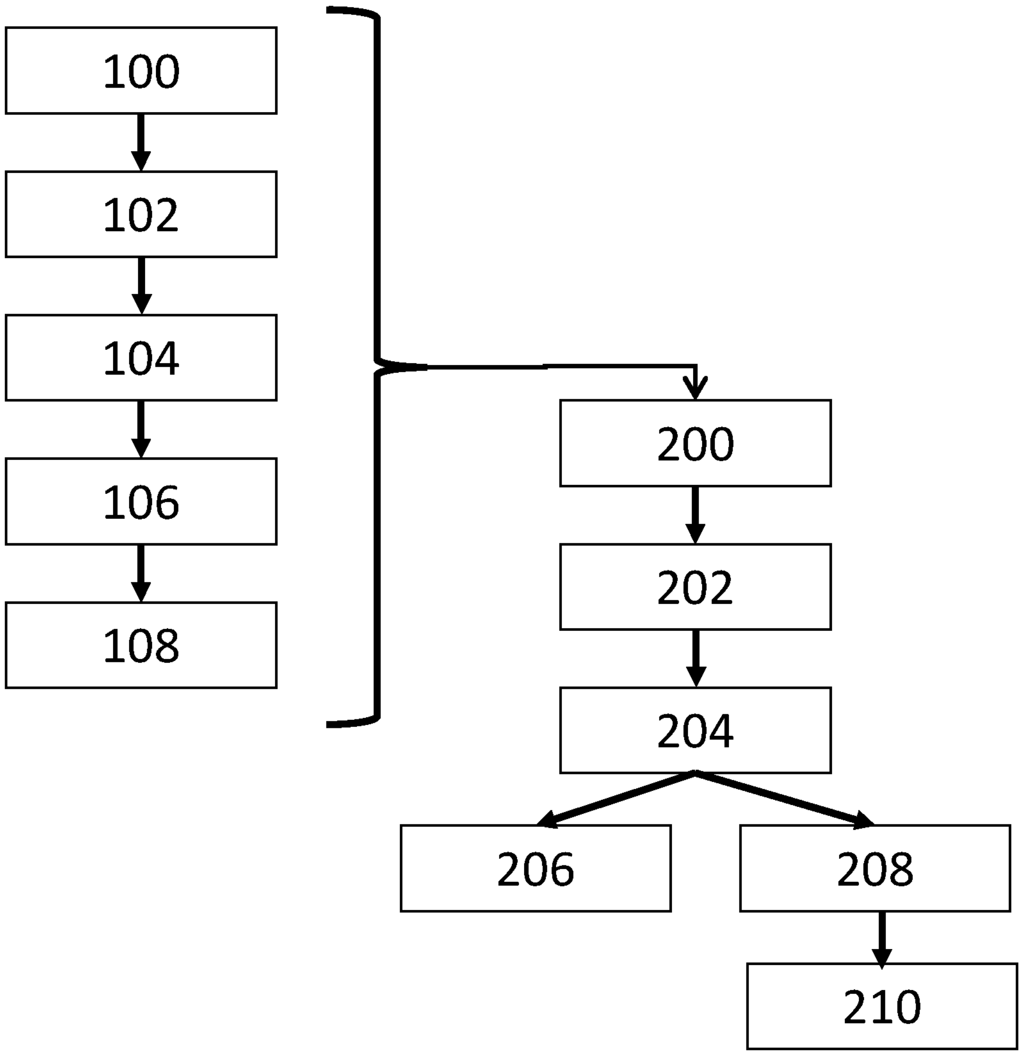
FIG. 1 is a flowchart of using an inventive security system.

The present invention has utility as a security response system based on an inventive non-injurious incapacitating device that may be deployed against a target individual, who presents a threat of physical injury to others or themselves, in order to stop the target in a non-injurious way thereby preventing injuries or death associated with mistaken identity, malicious or inappropriate deployment (prank) or accidental discharge. Furthermore, the inventive device is non-harmful as to the substances emitted therefrom. The delivery of the inventive device to the target individual can be accomplished in an intuitive movement of a tossing or throwing action. In some inventive embodiments, a launcher for the inventive device is provided as part of an inventive system. The launcher is operative to extend the deployment range and increase accuracy of the inventive device. As a result, untrained individuals, even under duress can still deploy the inventive device effectively without exposing themselves to further risk of injury. Similarly, a public safety officer can deploy the device in those instances where a subject might be non-communicative or combative, yet their actions do not pose an immediate threat to the officer targeted individual.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. Unless indicated otherwise, explicitly or by context, the following terms are used herein as set forth below. Also as used herein, "and/or" refers to and encompasses any and all possible combinations of one or more of the associated listed items, as well as the lack of combinations when interpreted in the alternative ("or").

The inventive device and system provide a resource for ordinary citizens and public safety professionals (illustratively including staff that interacts with customers at places of commerce (retail establishments, entertainment venues), education (schools and universities) and worship; security personnel; first responders; mental health professionals; police officers; and social workers) alike to use in a scenario in which a target individual threatens injury to themselves or others, illustratively including attempted mass shootings or other armed attacks, an individual experiencing a mental health crisis threatening themselves or others, domestic disputes with a threat of escalating violence, and non-cooperative or non-responsive individuals in a potentially harmful situation. The system with the deployed inventive device can be used to delay, disrupt, distract, degrade, or a combination thereof the ability to cause harm to others or themselves and additionally designate the target individual for subsequent identification. For ordinary citizens, the inventive device is safe and easy to use, requiring minimal training and physical capability. This resource provides a manifestly non-harmful tactical option for both ordinary citizens and public safety professionals to safely use in high stress situations. For public safety professionals, the manifestly nonharmful nature of the system and inventive device allows a new response modality beyond existing methods that does not have a weaponized appearance or intent. Two illustrative examples of this new response modality are: (a) a heavily armed individual enters a school to perpetrate a mass shooting. A teacher deploys the security response system which hinders the mobility and agility of the potential shooter allowing children and staff time to escape; and (b) Police encounter an individual behaving erratically holding a hammer, standing apart from others and who is nonresponsive to verbal commands. A crowd of citizens has formed around the police and the erratic individual. The police deploy the security system allowing them to subdue the individual in a non-harmful manner. The crowd of citizens observe that the police did not use lethal force nor did the police injure the individual.

The inventive system and device have the following overarching principles:

The inventive device and its effects when deployed, are not, by design, intended to directly cause physical harm to a target individual. The degradation in the ability of the target individual to inflict injury will be brought about illustratively through, limiting the mobility (physical restraint) and manual dexterity of the target individual. Further, the inventive device and its effects when deployed either accidently or indirectly, do not, by design, directly cause physical harm to individuals including a target individual. This principle applies illustratively in the case of inaccurate deployment in a threat situation, or due to malicious, mistaken or unintentional deployment. It is appreciated that the inventive device and system are easy to deploy in a stressful situation by an individual possessing normal physical abilities, do not require above average physical strength, agility, or coordination to deploy, and does not require extensive training. It is further appreciated that an inventive device has very simple, intuitive operations to prepare, arm, and deploy. In some inventive embodiments, deployment is accomplished by simply tossing the armed inventive device toward the target individual using a natural tossing motion.

For use by public safety professionals, the deployment, the effects, and the operation of an inventive device and the security response system may be more elaborate. By way of illustrative example, the deployment may be achieved via a specially designed launcher in addition to simple tossing/throwing by hand, response effects may be tailored or programmed for tactically specific scenarios or to match the mission needs of different types of public safety professionals. As noted above, the inventive device and security response system are manifestly non-harmful by design not only in operation, but also in manner of deployment and form factor. It is appreciated that the form factor and the appearance of the inventive device and system do not resemble a weapon, handgun, grenade, or club. Weapon-like implements are primarily designed to incapacitate a target individual via physical harm, even if the effect is non-lethal. In contrast, it is appreciated that the instant inventive device is fundamentally different in that it causes no harm directly and that it does not resemble a weapon. For ordinary citizens, it is appreciated that the non-harmful nature of the inventive device and its form factor may lower the resistance to deployment in a stressful situation and allow for the placement of the inventive system into environments that may be resistant to other response options. It is further appreciated that for ordinary citizens, the easy and intuitive deployment of an inventive device makes it a valuable tactical tool for use in stressful situations. This will empower ordinary citizens to consider tactical alternatives to protect themselves and others from potential injury in a stressful situation. The inventive device and the associated security system are designed to work within the framework of current options of "run, hide and fight" that are part of routine training. In each of the suggested actions, the inventive device and associated security system are designed to make that action more effective to delay, disrupt, distract, degrade, or a combination thereof the ability to cause harm to others or themselves and additionally designate the target individual for subsequent identification. As such, it is designed to empower the ordinary citizen and reduce the sense of helplessness or fait accompli. For public safety professionals, it is appreciated that the non-harmful nature of the inventive device, its deployment, and form factor, provide an alternative to other means at their disposal that have harmful and potentially lethal effects, and does not lead to unintentional escalation in the minds of the possible bystanders as well as the target individual. It is further appreciated that for public safety professionals, the inventive device also provides a manifestly non-harmful by design and appearance alternative to be deployed to control or disable a target individual. By way of illustrative example, a public safety professional confronting a situation where a target individual has caused or threatens to cause physical injury to others or themselves or who may be non-cooperative or non-responsive to verbal commands potentially due to an attack of mental illness or being under the influence of illegal substances. An inventive device provides a non-harmful option to help subdue the target individual and does not appear to bystanders or the target individual to be a weapon designed to hurt the target individual. For public safety professionals, the system adds an element to the continuum of force escalation outlined in the background. Between Stage 2 of voice command and Stage 3 of empty hand control, the proposed system can provide an element of "standoff control" that is nonharmful in operation, appearance as well as method of delivery.

Figure 4A:
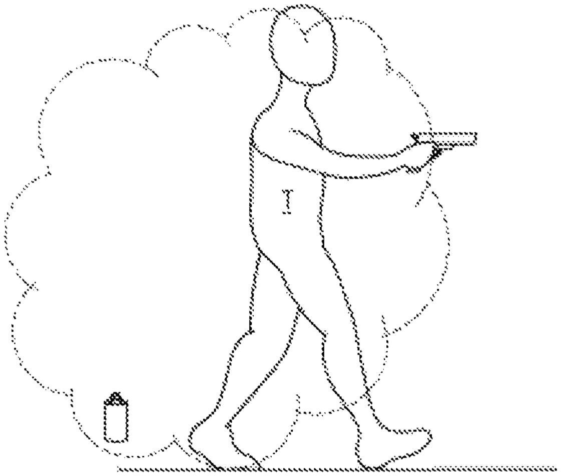
FIGS. 4A and 4B are a schematic depicting an effective volume of deployment relative to a target for contact with a floor (FIG. 4A) and ceiling (FIG. 4B)
Figure 4B:
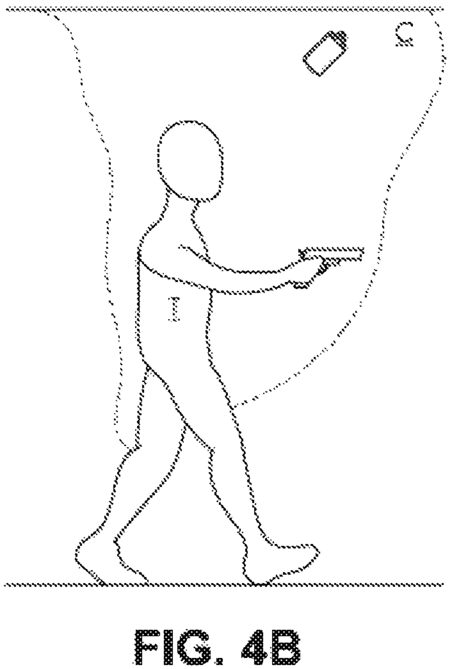
Figure 5A:
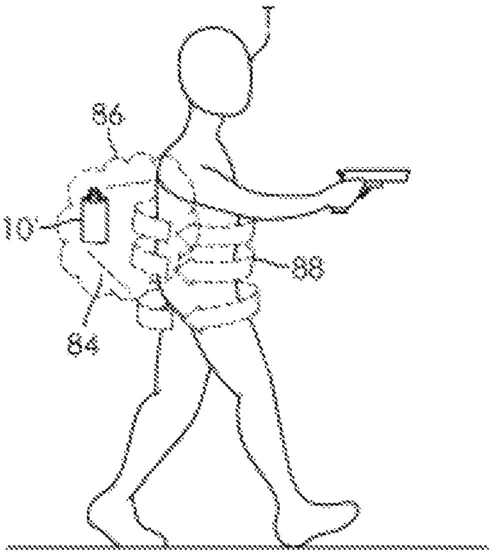
FIGS. 5A-5D are schematics depicting a number of potential effects deployed on the target including an inflated restraint (FIG. 5A); string, ribbon, or wire to entangle limbs (FIG. 5B); a liquid that sprays onto or beneath the target to effect mobility (FIG. 5C); a net to ensnare the target (FIG. 5D)
Figure 5B:
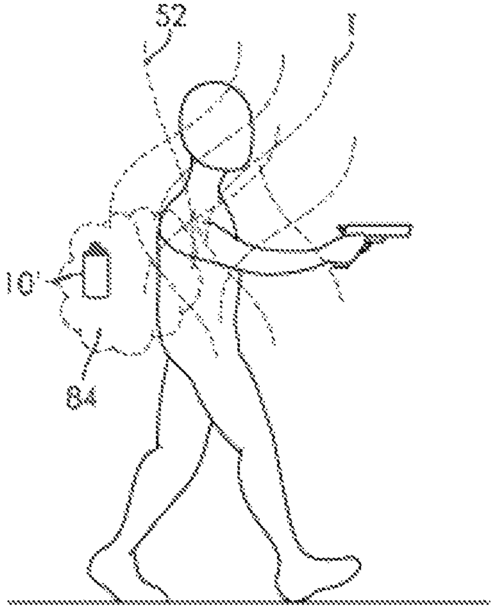
Figure 5C:
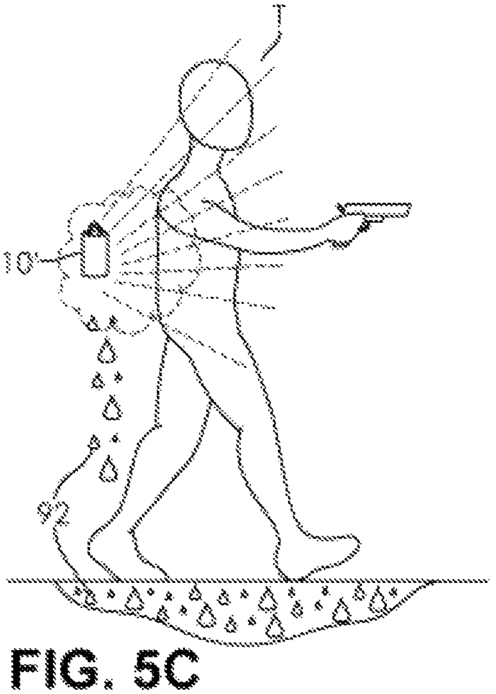
Figure 5D:
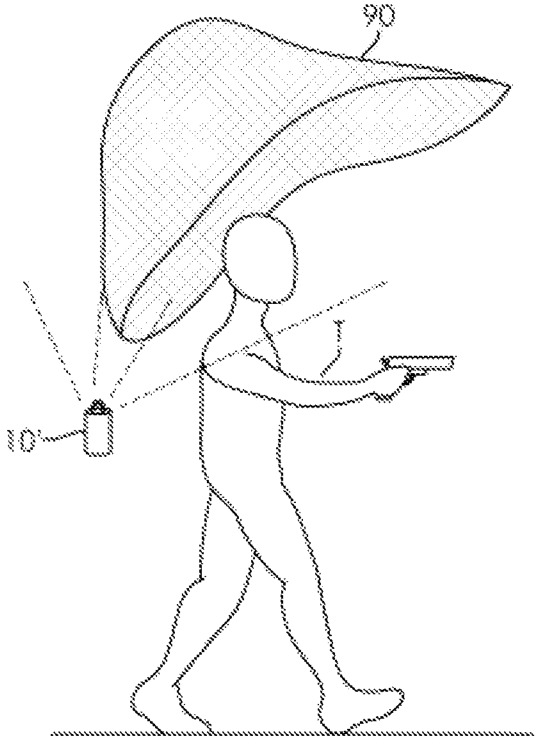

It is appreciated that deployment of an inventive device may be achieved from a short-range distance of approximately 3-5 meters for deployment by simple tossing. The deployment does not require a user to directly confront the target individual or otherwise expose themselves or others to excessive additional risk. For some applications by public safety professionals or by individual users, a greater operational range may be possible using means of deployment other than simple tossing, using instead a launcher, allowing the user to deploy the inventive device from an extended range distance of approximately 15-20 meters away from the target. It is appreciated that the inventive device is well-suited to be deployed in an indoor setting, although it may also be deployed outside. It is further appreciated that the effectiveness of an inventive device does not depend on precise delivery by a user to a specific location or a narrow effective area on the target individual. As shown in FIGS. 4A and 4B, the effectiveness volume of the inventive device is broad: a notional cylinder roughly two meters diameter and three meters tall surrounding the target individual as shown graphically in FIGS. 7A-D. Further, the inventive device does not produce any of its effects except for light and sound outside this cylinder thereby minimizing/eliminating collateral impact on individuals other than the target individual. It is appreciated that the effects are designed in such a manner that there are no countermeasures the target individual could take ahead of time or after the deployment that does not simultaneously lead to additional delay, disruption, distraction, and degradation in the ability of the target individual to inflict harm, thereby achieving the desired goal of a user in deploying the inventive device.

Referring now to the figures, FIG. 1 is a flowchart of using an inventive system for non-injurious incapacitation of a target with an inventive incapacitating device 10, as shown in FIG. 3. As detailed in the flowchart of FIG. 1, a method of use of the device includes arming the device at 100 and triggering the device at 200. Arming the device at 100 includes transitioning the device from a dormant storage state to an active state at 102. According to certain inventive embodiments, step 102 illustratively includes unplugging the device from a power supply, removing the device from a carrying unit, or removing the device from an outer cover. The device 10 is then launch at a target individual 104 and is accomplished either manually or through use of a launching device. In some inventive embodiments, an accelerometer detects the acceleration during 104 and arming the device 10 occurs when acceleration thereof exceeds a preset threshold 106. In still other inventive embodiments, the device 10 has electronics monitors short duration ballistic flight 108 as a failsafe to preclude premature triggering.

Thereafter, inventive device 10 is triggered 200 to deploy the mechanisms to achieve desired effects. An accelerometer, that is the same one used at 104 or a different accelerometer, continuously measures and monitors the motion of the device 202. The sudden change in direction or magnitude of the velocity associated with the device 10 striking the target individual or a surface adjacent to the target individual is measured 204. This sudden change in direction or magnitude of the velocity could even be associated with the target individual attempting to swat away the softly tossed device. The accelerometer detects this condition and after a pre-set delay (including no delay), a pre-set sequence deploys various effects 206 embedded in the device 10. In other embodiments, a proximity detector within the device 10 monitors the presence of the target individual as the device approaches the target individual 208. When the device 10 reaches a pre-set distance from the target (for example 1 foot) various effects embedded in the device are employed 210.

Figure 2A:
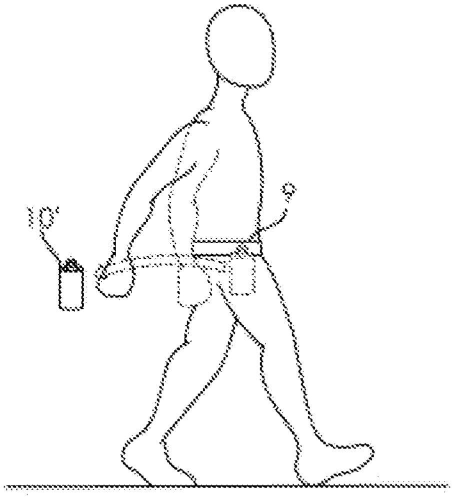
FIGS. 2A-2E are a schematic of the steps of deploying an inventive device in which a user obtains a device from a docking station (FIG. 2B) or holster (FIG. 2A) and deploys the device toward a target (FIG. 2C), the inventive device strikes the target (FIG. 2D) triggering primary effect and optional secondary effects or the device is triggered as it reaches a pre-set distance from the target (FIG. 2E), the effective range of the device upon deployment being such that the triggering in the vicinity of the legs of a standing target is effective to encumber the target, as shown in FIG. 4A.
Figure 2B:
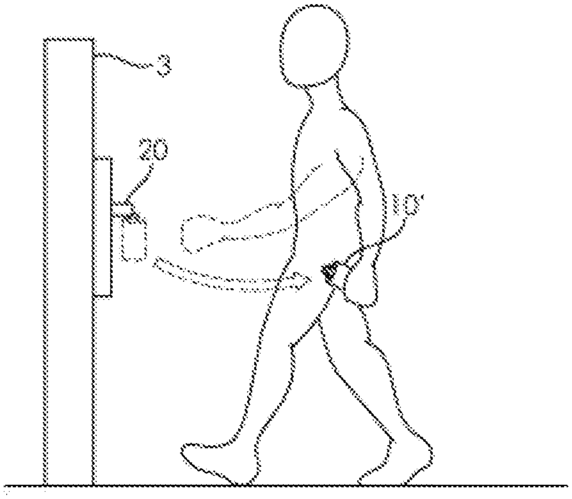
Figure 2C:
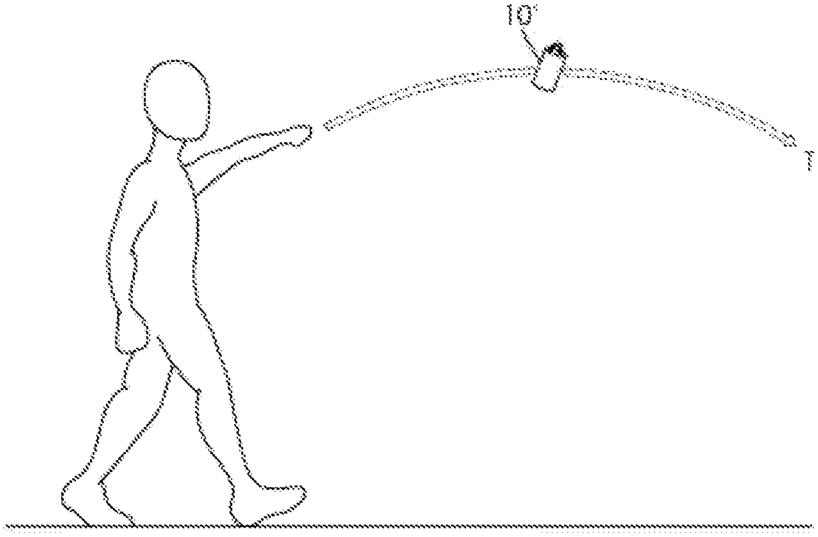
Figure 2D:
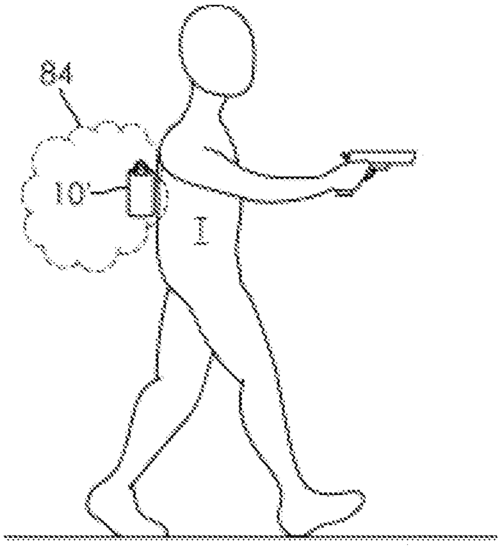
Figure 2E:
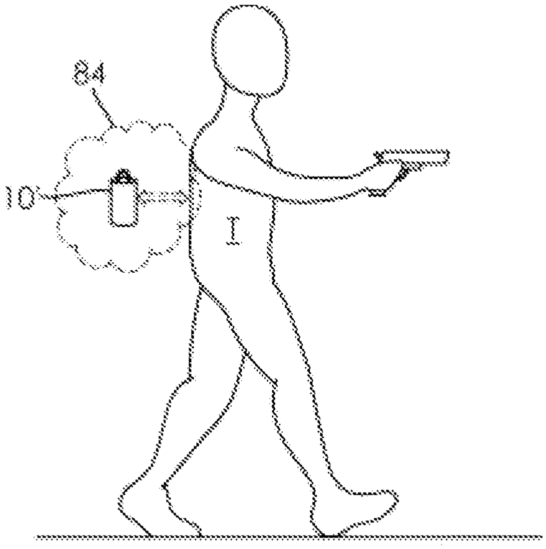
Figure 6:
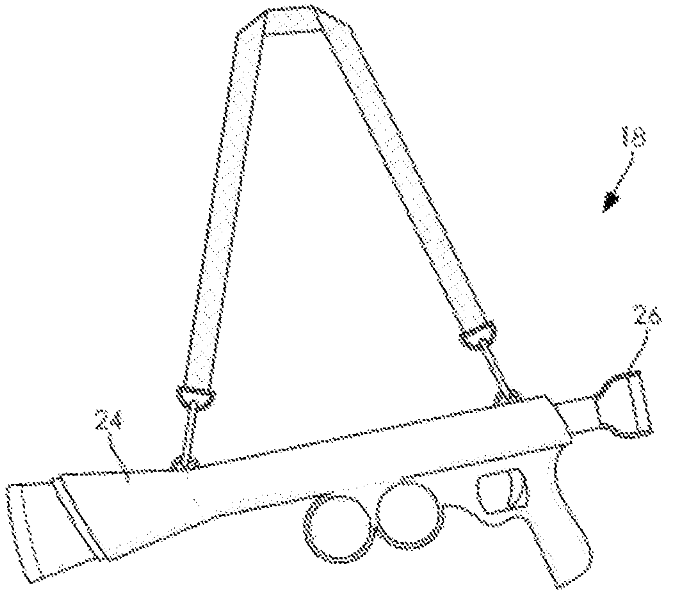
FIG. 6 is a depiction of a launcher for launching the inventive device according to certain embodiments of the present disclosure.

FIGS. 2A-2D schematically show the steps described in the flowchart of FIG. 1. That is, in FIGS. 2A-2C show steps 100-108 or a subset thereof use being carried out, to arm the device 10'. Inventive devices 10' and 10" are noted to be identical to inventive device 10 with the proviso that the housing shape is different, and as such while detailed in several drawings with respect to device 10', it is appreciated that these shown embodiments are equally applicable to the other devices 10 and 10", as well as those with other shapes. In FIG. 2A an inventive device 10' is removed from a carrying holster 9, while in FIG. 2B an inventive device 10' is removed from a docking station 20. In certain inventive embodiments, the docking station 20 electrically couples to the power supply 3 to provide electrical charge thereto. FIG. 2C shows an inventive device 10' held in the hand of a user and thrown toward a target individual, T. In other embodiments, an inventive system includes a launcher 18, shown in FIG. 6 for the inventive device 10'. As shown in FIG. 6, in certain inventive embodiments, the launcher 18 is a tube 24 adapted to selectively engage the inventive device 10 and a compressed gas supply 26. It is appreciated that in some inventive embodiments, the compressed gas supply 26 is a moveable plunger or a canister that may be pumped by a user to build up pressure of the compressed gas supply. According to such embodiments, a user may adjust the launching distance of the inventive device from the launcher based on how much or how little the user pumps the launching device. During the motion of the device 10 shown in FIG. 2C arming is in progress. FIG. 2D the triggering of steps 200-206 at the moment an inventive device 10 strikes a target individual, T thereby releasing a primary effect. It is appreciated that in some embodiments, secondary effects are also released with or following release of the primary effect. Representative secondary effects illustratively including the following: a secondary effect directly coupled to and actuated or released by the primary effect; multiple secondary effects deployed simultaneously after the primary effect is released; and a series of secondary effects that are deployed in a cascading or sequential manner after the primary effect is released. In FIG. 2E, the device 10 is triggered as it reaches a pre-set distance from the target per steps 200-204-208-210.

Figure 3A:
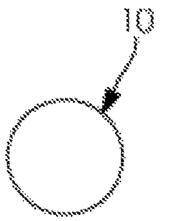
FIGS. 3A-3D are various exemplary external shapes of an inventive device as a sphere (FIG. 3A), a cylinder (FIG. 3B) and a sack (FIG. 3C)
Figure 3B:
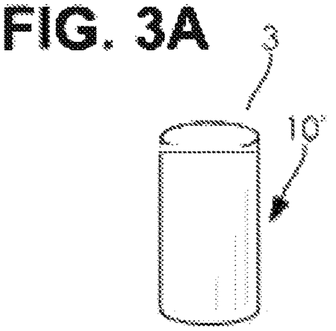
Figure 3C:
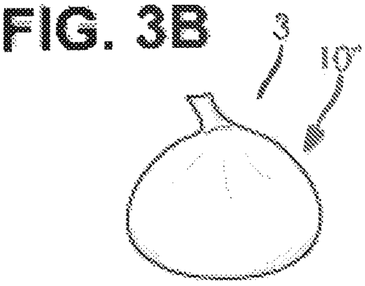
Figure 3D:
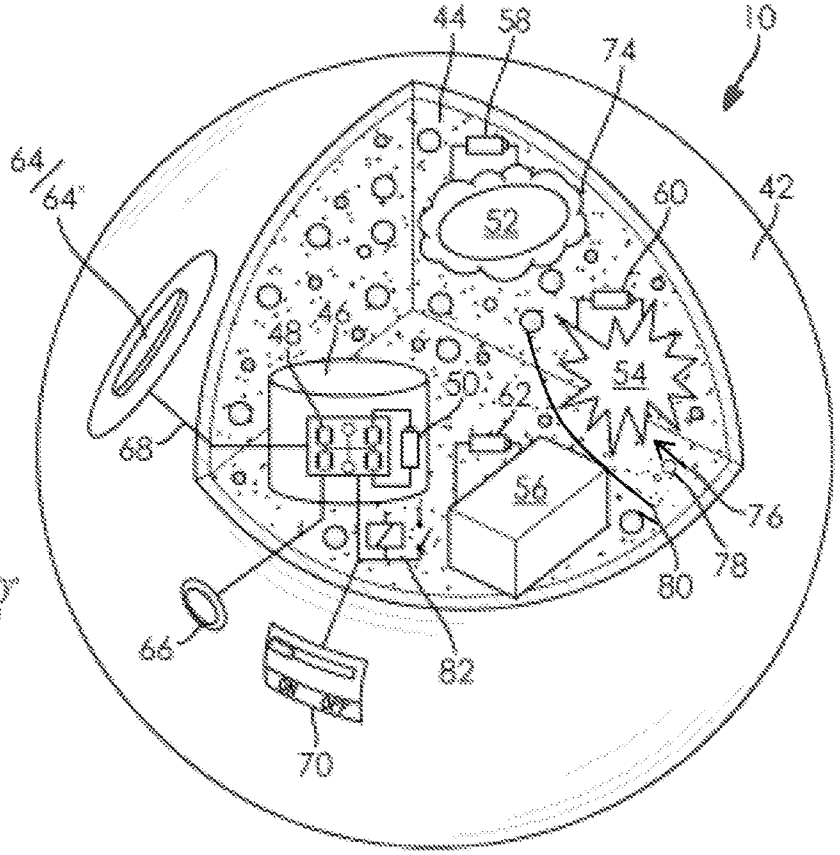

FIG. 3D shows a partial cutaway view of an inventive device shown generally at 10. While FIG. 3D shows one embodiment of an inventive device 10, it is appreciated that other form factors and placement of components are possible both on the interior and exterior of the inventive device 10, contemplated herein, and incorporated into the instant disclosure. The inventive device has an exterior layer 42 defining a contained volume 44. It is appreciated that the exterior layer 42 readily ruptures upon contact with a target individual, T to physically expose effects contained therein or in proximity thereto, or in proximity thereto, or building surface such as a ceiling or floor within an effective range of T. In some inventive embodiments, a primary effect 46 is within the contained volume 42. It is appreciated that in some inventive embodiments the primary 46, once triggered, deploys to a size of at least 10 times that of the contained volume 42. A control circuit 48 interconnects a power supply 50 and the airbag module 46. It is appreciated that while FIG. 3D shows the primary effect 46 as an airbag module, other inventive embodiments have other primary effects as discussed below. Regarding the airbag module, in some inventive embodiments, the actuation of the airbag module is a chemical reaction causing a rapid expansion of gas in a contained bag causing the exterior layer 42 of the inventive device 10 to rupture thereby causing the airbag module to inflate. In some inventive embodiments, secondary effect(s) 52, 54, 56, or a combination thereof (discussed in further detail below) are coupled to a primary effect 46—the secondary effect(s) 52, 54, 56, or a combination thereof are connected directly to and actuated by the primary effect 46. As an illustrative example, if the primary effect 46 is an airbag module that expands to wrap around the target individual, T, a secondary effect can be strings, ribbons, or tendrils 52 that are impelled outward by the airbag module actuation. In other inventive embodiments, that the secondary effects 52, 54, 56, or a combination thereof are self-powered and each contain a unique power supply 58, 60, and 62; respectively. Illustrative examples of this type of secondary effect are an LED light or an audio tag 54 that adheres to a target individual, T. In some inventive embodiments, a secondary effect is a passive effect illustratively including physical tags 56 that release via rupture to label the target individual, T with a substance that illustratively includes an ink or dye, a glue or other tacky material that temporarily impedes dexterity, a lubricant, or other materials to impede dexterity or mobility, a powder, a dust, or smoke to impede vision and distract a target individual, T. It is appreciated that in inventive embodiments, multiple of the aforementioned secondary effects are incorporated into an inventive device 10. While the power supply 50 may be internal to the contained volume 44, it is appreciated that in some inventive embodiments the power supply 3 is external to the contained volume 44 as shown in FIG. 2B. It is appreciated that the power supply 3 or 50 in each instance is independently batteries, capacitors, or a combination thereof.

A sensor 64 provides a contact signal when the exterior layer 42 contacts T. It will be understood that the inventive device 10 is considered to contact a target when the inventive device makes direct physical contact with the body or clothing of individual, within a proximity trigger is deployed within a preselected distance from T or when the inventive device 10 comes into contact with another surface, such as a floor, ceiling or wall that is within a 2 meter radius of the target individual, T. In some inventive embodiments, additional sensors 66 are present. As an example, the additional sensor 66 is a proximity sensor. The sensor 66 is readily operated based on optical or ultrasound waves. The distance to the first scattering object from the sensor 66 is measured by, for example, measuring the round-trip delay between a transmitted and received pulse. The control circuit 48 in some embodiments is configured to preset threshold distance at which the primary 46 or the secondary effects 52, 54, 56, or a combination thereof are to be deployed. It is appreciated that in some inventive embodiments the control circuit 48 provides a triggering signal to the primary effect 46 upon receipt of the contact signal. It is further appreciated that in other inventive embodiments the control circuit 48 contains sensors to trigger the release of not only the primary effect 46, but also secondary effects 52, 54, 56, or a combination thereof. While FIG. 3D shows the control circuit 48 as a single component independent of the primary effect for visual clarity, it is appreciated that in some inventive embodiments, the control circuit 48 includes multiple components, with some sensor and release components integrated into the primary effect 46 and a separate main inventive device control circuit. While an inventive device 10 is shown in FIG. 3D as spherical, it is appreciated that according to inventive embodiments, an inventive device 10 can be any geometric shape, illustratively including cylindrical (FIG. 3B), cuboidal, pyramidal, any polyhedron, or a sack (FIG. 3C). In some inventive embodiments, the exterior layer 42 is formed of glass, polyethylene terephthalate (PET), high-density polyethylene (HDPE), polyvinyl chloride (PVC), polypropylene (PP), polystyrene (PS), low-density polyethylene (LDPE), polylactic acid (PLA), cellulose, rubber, elastomers, fabric, cloth, aluminum, tin, or a combination thereof. In other inventive embodiments, the control circuit 48 interconnects to the sensor 64 with wiring 68 internal to the contained volume 44. While FIG. 3B shows the wiring 68 as fully enclosed within the contained volume 44, it is appreciated that in other inventive embodiments, the wiring 68 can be integrated on the exterior 42, or within a skin of an inventive device 10. In still other inventive embodiments, an arming module 70 prevents unintended activation of the primary effect 46. According to embodiments, the arming module 70 has a structure and function as described in U.S. Pat. No. 3,343,493, which is hereby incorporated by reference. In inventive embodiments, the arming module 70 enables two-stage arming of an inventive device. It is appreciated that in some embodiments, a relay switch 82 is in electrical communication between the arming module 70 and the control circuit 48. In embodiments, an inventive device 10 has a plurality of tendrils 52 within the contained volume 44. It is appreciated that in some inventive embodiments, the plurality of tendrils 52 are mechanically coupled to an airbag module of a primary effect 46. It is further appreciated that in other inventive embodiments, an adhesive coating 74 is present on the plurality of tendrils 52. In other embodiments, an inventive device 10 has a tag 56. It is appreciated that in still other inventive embodiments, the tag 56 is a dye packet, a lachrymator packet, a smoke generation packet, or a combination thereof. In embodiments, an inventive device 10 contains a filling material 76. In some inventive embodiments, it is appreciated that the filling material 76 is any of the secondary effects described above. In other embodiments, the filling material 76 includes a foaming agent 78 causing the filling material 76 to foam and cover the target individual, T when an inventive device 10 is triggered. In other inventive embodiments, the filling material 76 contains adhesive 80 that sticks to T when an inventive device 10 is triggered.

In still other embodiments, a sensor 64' is present in the device 10 is a proximity sensor operating to trigger the device 10 within two meters of a target individual, T. It is appreciated by sensing the movements of the target individual, T relative to inanimate objects during flight of the device 10 that false triggers associated with proximity to building structures and appurtenances is precluded. It is appreciated that electromagnetic, capacitive, or proximity sensor is well-suited to distinguish a target individual, T from surroundings based on movement profiles.

FIGS. 3A-4F is a schematic of the steps of deploying an inventive device. A user obtains the device 10' from docking station 20 or holster 9 and releases it toward the target individual, T. While FIG. 3C shows the inventive device being tossed by hand, which is the easiest and most intuitive method for deployment, it is appreciated that other methods are possible, in particular, for deployment by a launcher for use by public safety professionals or individual users. The act of undocking, as shown in FIG. 2A or 2B, and tossing the inventive device 10', as shown in FIG. 2C, enables the arming of the inventive device. The inventive device 10' experiences a sudden change in direction or magnitude of the velocity exceeding a preset threshold as measured by the sensor 64, 64', or 66 indicating the inventive device 10' either striking the target, as shown in FIG. 2D, or an area near the target (FIG. 2E), is deflected by the target individual, T in a defensive maneuver, or a surface within an effective range (FIG. 4A or 4B), the primary effect 46 and optional secondary effects 52, 54, 56, or a combination thereof.

FIGS. 4A and 4B. are schematics depicting an effective volume of deployment relative to a target individual, T. An inventive device may be effective if striking within a region approximating a cylinder of about 2 meters (m) diameter surrounding the target individual, T. Precise placement of the inventive device on the target individual, T is not necessary for the inventive device 10' to have an effect on the target individual, T. As a result, device 10' triggering on a floor, F or ceiling, C or wall within the effective range of the device, 10' has the intended hindrance of the target as shown schematically in FIGS. 4A and 4B, respectively. However, it is understood that the efficacy of various mechanisms may be reduced when the inventive device strikes a surface farther from the target. For some applications, in particular by public safety professionals, more precise deployment may be desired, however for civilian applications this target cylinder enhances the utility of the device.

Figure 7A:
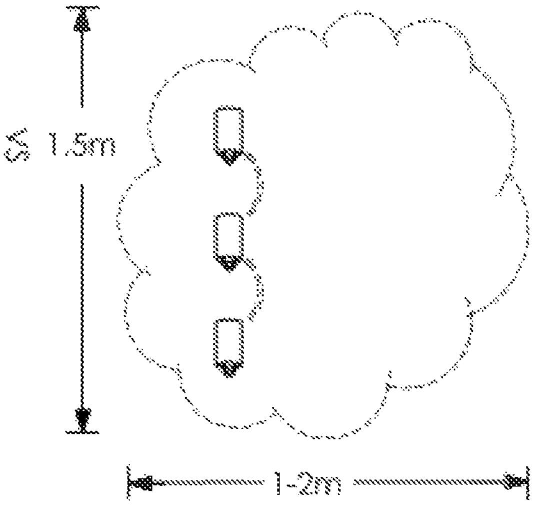
FIGS. 7A-7D are schematics that illustrate the effective volume and expansive directionality of a primary effect, the typical dimensions of the effective range with the primary effect expansively deploying with directionality at a height corresponding to the head, waist, or legs of a target (FIG. 7A); uniform deployment at a primary effect from a device at waist height (FIG. 7B); a volume of effective range is shown relative to a target (FIG. 7C), as are the locales of primary effect expansion to fill the volume of effective range (FIG. 7D).
Figure 7B:
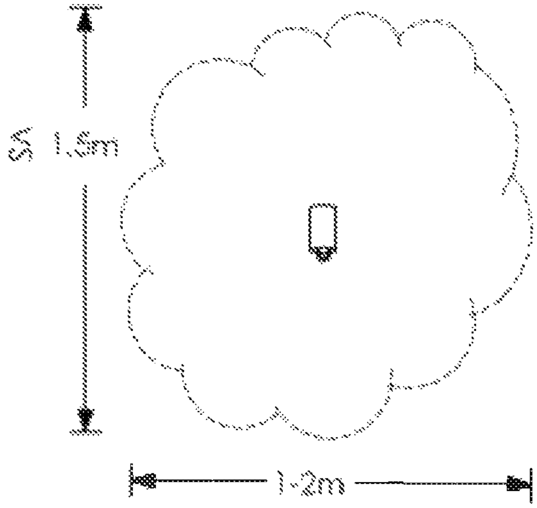
Figure 7C:
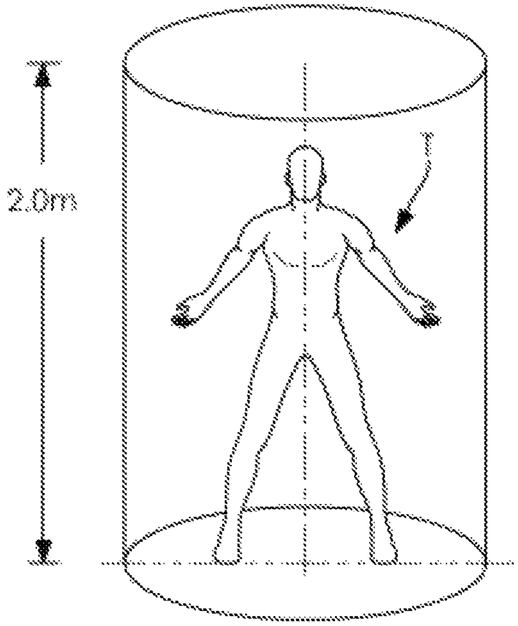
Figure 7D:
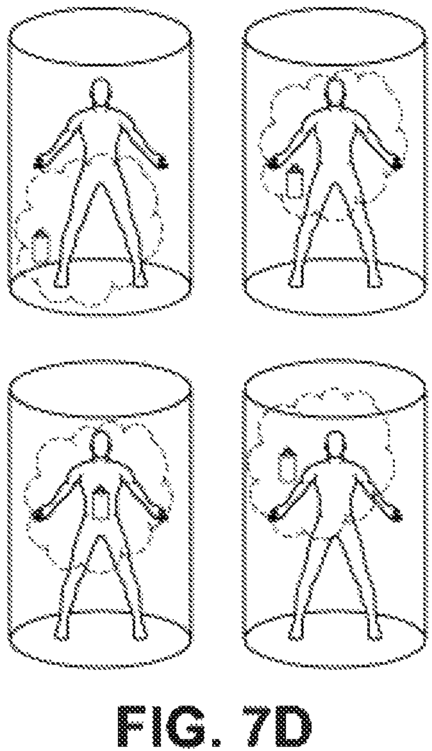

The effective volume and expansive directionality of a primary effect are further illustrated with respect to FIGS. 7A-7D. The typical dimensions of the effective range with the primary effect expansively deploying from the device 10' with directionality at a height corresponding to the head, waist, or legs of a target are shown in FIG. 7A. Uniform deployment of a primary effect from a device at waist height provides an expansive primary effect with device centrally located in the primary effect volume, as shown in FIG. 7B. A volume of effective range is a cylinder of approximately 2 meter diameter relative to a target is shown in FIG. 7C. Various locales of primary effect expansion to fill the effective volume relative to a target are shown in FIG. 7D.

As discussed above, an inventive device is a variously shaped (such as a sphere, an oblate spheroid or a cube) object that can be tossed or thrown at or near a target individual, T that will impact on the target individual, T or a surface adjacent to the target. Effects within the inventive device are triggered after the inventive device strikes the target individual, T or near the target individual, T consisting of a primary effect and possible secondary effects.

The following are design elements and associated functions of embodiments of an inventive device. Handle, grip, or gripping region, illustratively including: soft or compliant in parts (e.g., partially inflated ball), a handle. Adhesion for attaching to target individual's body or whatever it comes into contact with (like in a mouse glue trap). Conformal surface and/or compliant mass illustratively including a bean bag or a partially deflated dodgeball which maintains momentum to conformally cover target individual impact location. Docking station, holder, or storage container that holds an inventive device or multiple inventive devices. In embodiments, provides electrical power to maintain charge in inventive device. Removal of the inventive device from the holder may be part of an intuitive arming process.

In some embodiments, there are four elements to an inventive device: (1) method of deployment; (2) sensing/control module; (3) Power/Energy sources for the inventive device; (4) Effect or mechanisms to bring about desired effects of delaying, disrupting, distracting, or degrading the ability to cause harm to others or themselves and additionally designate T for subsequent identification Details of various options for each element of the inventive device and their operations:

Method of Deployment

Toss/throw: For ordinary citizens this is the preferred method of deployment. Throwing or tossing is a natural action that does not require specialized training and can be performed by individuals within a broad range of age, physical ability and dexterity when the operating distance is reasonably short (3-5 meters). This is particularly so since the effects do not require a highly accurate placement on the target nor a speed of delivery that is outside the range of all able-bodied individuals.

Launching mechanism (tube, sling, etc.): For public safety professional use in an outdoor setting, the standoff distance could be longer (15-20 meters). In that case, a delivery gadget that looks like a plastic tube (i.e., not like a gun) is provided and the launching is achieved via compressed air could be helpful. An ordinary sling shot or other toy-line gadgets designed to launch a tennis ball can achieve the same purpose and may be more intuitive for even ordinary citizens to utilize, allowing them to use the inventive device which being a greater distance removed from the target and threat of danger.

Methods for deployment would differ depending on use case and user.

Deploying this inventive device by ordinary citizens in schools, places of worship, public events would require intuitive and simple operation. The purpose would be to delay, disrupt, distract, degrade, or a combination thereof the ability to cause harm to others or themselves and additionally designate T for subsequent identification in order to provide a time window for ordinary citizens and others to flee, barricade, seek shelter or possibly subdue/attack target.

Use by public safety professionals (e.g., police officers or other private security personnel) as non-harmful response for escalation-of-force options could have more complex deployment methods. By way of example, an inventive device or a volley of such devices are readily deployed using launchers such as 18 or dropped from drones to quell violence without escalation. It is appreciated that such coordinated deployments are readily programmed to occur in response to a central command signal or other use selected inputs that illustratively include gun fire detection or thrown projectile detection. As a result, non-harmful de-escalation occurs without resort to potentially dangerous conventional measures such as lachrymators, water cannons, rubber projectiles, or concussion devices.

Sensing/Control Module:

According to embodiments, the sensing/control module has several functionalities to be achieved, including:

a. Arming (making the device "live"): According to embodiments, the inventive device when not in use is stored in a holder mounted on a wall (potentially connected to a power source) or is carried by an ordinary citizen or public safety professional in a holder attached to the belt (potentially connected to a portable energy source) and is in a dormant mode. According to embodiments, removing the inventive device from its holder is the first step in arming the device, waking up the device making it ready for activation. According to embodiments, this action is achieved by placing a switch that bridges the holder and the inventive device. When the inventive device is removed from the holder, that switch is opened thereby initiating operations to arm the inventive device. The second step in arming the inventive device involves launching the device as described earlier in the section "Methods of Deployment." According to embodiments, the inventive device contains sensing mechanisms described in the next section that are activated by this acceleration accomplishing the second step of arming, as shown in FIG. 2. These safety mechanisms ensure that the inventive device is not accidentally activated while still mounted in its holder or when removed from the holder but while being in the possession of an ordinary citizen or a public safety professional. Once the acceleration signal is detected, the inventive device enters in an active mode.

b. Triggering the Effect—The structures within the inventive device that provide the desirable effects of delaying, disrupting, distracting, degrading the ability to cause harm to others or themselves and additionally designate T for subsequent identification, have to be triggered when the inventive device either makes contact T or is within a predetermined distance from T. This requires the inventive device to have sensing capability to decide when either of these conditions occur and the send appropriate control signals to trigger the appropriate effects.

c. Timing the Triggering of Multiple effects—A single inventive device can contain multiple mechanisms bringing about different effects. Depending on the nature of the effect, there could be a sequence in which the effects should be deployed. That is accomplished by the timing control circuit. In the case of more sophisticated inventive devices that are in communication with each other through Bluetooth or other wireless connection. In that case the timing module coordinates the timing of different effects contained in separate inventive devices deployed by different public safety professionals to maximize the desired impact on T.

Options for Sensors:

a. Accelerometers for motion sensing: As described above, according to embodiments, the arming module 70 as well as the triggering of the effects is achieved by sensing the state of motion of the inventive device (moving, stopped etc.). According to such inventive embodiments, this is achieved by micro-electro-mechanical devices for measuring the acceleration of the platform along a preferred axis. Such devices are miniaturized and are widely available in the market.

b. Mechanical pins or spring based for measuring contact: According to embodiments, the sensors 64, 64', or 66 include a mechanical pin that moves within the housing such that when one end of the pin makes hard contact with another object, it is pushed back within the housing that activates an electrical switch.

c. Optical or Ultrasonic Proximity Sensor: According to embodiments, the triggering of the primary effect 46 is achieved when the inventive device is in close proximity of T. According to embodiments, the sensor 66 is optical and uses a light source such as light emitting diode (LED) of various wavelengths and a photodetector deployed in a manner that it senses the LED light scattered back by T. When that scattered light exceeds a pre-set threshold, it is inferred that the inventive device is at the desired distance from T and the effects are triggered. Such sensors 66 are commonly found in automatic water faucets, urinals or toilets in public restrooms. Alternatively, the sensor 66 is an ultrasonic transducer/detector system that measures the distance to the first object it encounters. The effects can be deployed when the distance measured is below a preset threshold value, typically multiple inches.

d. Orientation Sensing/Control: According to some inventive embodiments, the orientation of the inventive device relative to the direction of motion is sensed by using gyroscopic and/or by using micro-electro-mechanical devices associated with the control circuit 48. Such orientation detection is conventional to smart phones or tablets. It can also be measured by using three axis accelerometers as well as proximity sensing devices. According to embodiments, the orientation of the inventive device is controlled by distributing the weight within the inventive device in an uneven manner. Gravity ensures that the heavier part of the inventive device self-orients downwards and the inertia ensures that the heavier parts of the inventive device lag the lighter parts when set in motion. This effect establishes a vertical direction for deployment of various effects.

Control Circuitry (48): According to embodiments, the signals from the sensors 64, 64', 66, or combinations thereof are conveyed to an electronic control circuit 48 containing integrated circuit chips and/or discrete electronic components, as shown in FIG. 3D. These circuits 48 contain the signal processing as well as logic operations to realize the desired functionalities described above.

Power/Energy Sources for the Inventive Device (3 or 50)

Power for Sensing and Control: According to embodiments, the sensing and control operations are accomplished by control circuit 48. Therefore, in embodiments, the power required is supplied by any of the following non-exhaustive list of options:

a. Battery: Rechargeable or single use b. Capacitor c. Mechanical harvesting: According to embodiments, the mechanical motion of the inventive device is converted into electric power by using armature-like structures. Illustrative examples of such an effect can be found in blinking lights built into shoes or bouncing transparent balls.

Power for actuating the effects (FIGS. 2B and 3D): Some of the effects described in next section require substantial movement and transformation of material. Others require a simple release. Therefore, the power and energy requirements of these classes of effects will be different. In this section, some illustrative examples of the options for actuating different effects are provided.

a. Rapidly expanding gas caused by a chemical reaction in primary effect.

b. Rapidly expanding gas released from a container storing air compressed under high pressure in primary effect.

c. Rapidly expanding solid (foam) caused by chemical reaction in primary/secondary effect.

d. Electronic battery or capacitor to power effects that are based on generating light or sound in secondary effect.

e. Mechanical: Compressed or wound-up springs when suddenly released can provide the power for actuating some of the effects that require a forceful expulsion or expansion or a material structure in primary/secondary effect.

f. Gun powder, firework chemical reactions in secondary effect: these chemical reactions lead also to rapidly expanding gas like the one described above. The difference is in the nature of the chemicals as well as the energy density of the associated reactions. Gun powder as well as chemicals contained in fireworks have a much higher energy density and therefore are commonly used for strong and in many cases towards a destructive end purpose. However, a small quantity can serve the goal of the inventive device of actuating an effect without causing injury to T.

Standby powering mechanism (FIG. 2B):

a. Electronic: According to embodiments, the inventive device includes an A/C wall outlet, rechargeable battery pack that provides a powering mechanism to the inventive device.

b. According to other embodiments, a standby powering mechanism is self-contained in the device holder/dock 20 that is portable.

Effects or mechanisms to bring about desired effects of delay, disrupt, distract, degrade, or a combination thereof the ability to cause harm to others or themselves and additionally designate T for subsequent identification Primary Effect (46): As described above, the inventive device deploys a primary effect, as shown in the aforementioned drawings. The purpose of this primary effect 46 is to delay, disrupt, distract, degrade, or a combination thereof the ability to cause harm to others or themselves.

According to embodiments, the primary effect 46 is a mechanism that is triggered after the inventive device contacts T or near T.

According to embodiments, this primary effect 46 is a rapidly inflating or expanding a structure (may be inflated via an airbag style chemical reaction, or other type of method to rapidly expand a structure). According to embodiments, this expanding structure is a specifically shaped airbag or a biaxially-oriented polyethylene terephthalate (BoPET) balloon that when fully inflated 84 will bring about the desired effect of degrading the ability of the target to move his arms and legs freely.

According to embodiments, this structure 84 adheres to 28 individual via either an adhesive surface on the outside of the inventive device or through integrated adhesion structures that deploy with the primary effect.

Adhesion structures 86 may be glue based, or they may be microstructures similar to burrs on plant spores, or they may simply be a result of static charge created in the deployment.

In some cases, adhesion may not be necessary, if the design of the wrapped structure 88 is such that it wraps directly around individual.

In one instantiation, when inflated, this wrapped structure 88 may be stiff and relatively rigid. Although it is stiff, and rigid, the structures may include curved or articulated effects that bend or wrap around the target individual's limbs, torso, or head.

In another instantiation, when inflated the structure may be only partially inflated but with t tendrils 52 to hinder mobility and distract T.

In another instantiation, the tendrils 52 are simply a plurality long strips of thin material such as BoPET to hinder mobility and distract T.

Due to its size and rapid inflation or deployment, the primary effect 46 also will distract T and their response and delay subsequent actions.

According to embodiments, the primary effect 46 is designed in such a manner to wrap around T to hinder limb movement and degrade T's ability to continue their intended actions.

Multiple options for the shapes are envisioned for various inventive embodiments. Some illustrative examples are listed below:

a. One shape 88 is designed to wrap around the upper torso of T effectively preventing ability to move arms. This embodiment is similar to a strait jacket used on patients in psychiatric institutions or prisons to immobilize particularly dangerous members. The shape is largely of a cylindrical nature possessing multiple members (arms) that curl in the direction dictated by the orientation of the inventive device.

b. Another option for the shape consists of multiple tentacles 52 that when partially inflated interfere with the free movement of the limbs for T given that the tentacles wrap around T at least once, and preferably multiple times.

c. A third option is the shape of a parachute 90 or a spherical balloon or a curtain that is large enough to significantly degrade the mobility of T and to increase its visibility.

d. A fourth option is a thin BoPET sheet with slots cut into them that resembles a net, perhaps with weights attached to its extremities. This net is deployed forcefully moving up and towards T. The weights cause this sheet to come down wrapping T thereby reducing the target's mobility as well vision.

Activation Mechanism: In some embodiments, the activation mechanism works similarly to various motorcycle helmets based on airbags, airbag curtains deployed in cars and airbag jackets for fall projection of elderly patients and is contained within control circuit 48. Such airbags are prefabricated in specific shapes and folded to fit in a small volume. When inflated by a sudden injection of a large volume of gas, they unfold into the specific 3D shape embedded in the design. The expanding gas mechanism is provided by a chemical reaction deployed in standard airbags or any other method of containing a compressed gas at high pressure.

Control Mechanism: According to embodiments, the deployment signal is generated by the control circuit 48 after initial arming and when the inventive device experiences a sudden change in direction or magnitude of the velocity due to making contact with T or being deflected. The change exceeds pre-set threshold as shown in FIGS. 2D, 2E, 4A, 4B, and 5A-5D. According to embodiments, the control circuit 48 is a MEMS accelerometer followed by an integrated circuit for performing post processing. This will generate a signal that will trigger the activation mechanism.

Alternatively, a sensor 64' that measures proximity of the inventive device to an object can be used to generate the triggering signal for deployment of various effects. Such proximity sensors can be based on light or ultrasonic waves and the threshold distance from the object can be preset when the triggering signal is generated.

Special Requirements: A desired effect of the inventive device is fully achieved when curling or wrapping of the device happens against the torso of T either from the front or back. Accordingly, it is desirable for the inventive device to contact T in a specific orientation where the direction of motion is parallel to be the direction of the curl of the airbag when inflated. If the curling happens away from the body of T, the desired effect is not fully achieved, however impact and deployment will still be apparent to T.

Deployment Options: The deployment may be from any direction (front, back or side). The inventive device may be launched by hand. If the inventive device is preloaded into a tube-like launcher with appropriate orientation assured, that removes an addition manual step of ensuring the proper orientation before inventive device launch. The inventive device may also be weighted in a manner that allows for the natural orientation of the inventive device to occur in flight. For some uses cases, in particular for ordinary citizens, the inventive device does not necessarily require precise delivery to a specific location or orientation on T, but instead is effectively deployed if striking within a region surrounding T of approximately 2 meters in diameter, as shown in FIGS. 4A and 4B.

Use Scenario: As an example, one user of this effect is envisioned to be law enforcement officials when facing a situation where there is a pressing need to secure T from a standoff distance without causing any direct injury to T. Another civilian use is for home defense against an intruder in lieu of guns. While such a system cannot protect against an intruder that surprises the homeowner with a gun to the head, it can somewhat even the playing field when the homeowner has an advance warning and the intruder is carrying weapons other than a gun.

Secondary Effects (52, 54, 56): According to embodiments, the inventive device additionally includes secondary effects. These secondary effects are used to further deter/distract/hinder/illuminate/confuse/label T. Secondary effects complement the effects of the primary effect. These secondary effects are mechanisms within the ball that are triggered after the ball makes contact with T. Alternatively, a proximity sensor could trigger these effects when the inventive device is a pre-set distance away from T. These effects may be deployed simultaneously with the primary effect, or they may be deployed in a cascading series of effects depending on the use case, or user need.

Secondary effects may be powered and actuated in whole or in part by the primary effect power and actuation method; or secondary effects may be independent of the primary effect.

According to embodiments, secondary effects illustratively include individually and in various combinations:

a. Aerosolized glue and/or paint (or opaque glue);
b. Impulse of airbag inflating may knock target individual to ground;
c. Wires, or cords that impede motion (e.g., fishing line, netting);
d. Mylar or other ribbon to tangle arms and hands;
e. Confetti or powder to stick to target individual's head and hands to hinder vision and dexterity;
f. Silicone liquid, carbon powder or other lubricant materials to reduce grip dexterity and hinder mobility;
g. Smoke/dust/dye to block vision;
h. Odor, noise, flashing lights to distract/disorient;
i. Dyes, lights, or marking materials released to label target individual and to prevent blending in and escaping in confusion, in for example, a potential mass shooting scenario;
j. Chemical expanding foam to hinder dexterity; and
k. Adhesion materials such as glue or other tacky substances to amplify other effects.

Detailed below are four illustrative examples of types secondary effects. These are not mutually exclusive nor are they definitive of all possible secondary effects. The invention described in this document is a system that delivers a primary effect and in some inventive embodiments, several secondary effects.

(1) BoPET tape confetti or ribbon energetically deployed: According to embodiments, this secondary effect has glue applied to it so when it lands on T, it sticks to the exposed skin or articles of clothing. According to embodiments, it is weighted on the ends to wrap around or otherwise entangle limbs. Ribbon naturally tangles with limbs and clothing to entangle the limbs of T and will decrease the ability to move as freely and thereby reducing the ability of T to inflict violence on themselves or others.

Arming Mechanism (70): According to some inventive embodiments, the secondary effect includes long strings of brightly colored and thin but strong BoPET tape that are compactly stored in a container within the inventive device. According to embodiments, these strings are expelled forcefully from the container and the outer envelope by using a blasting cap, compressed spring, or a compressed gas. This deployment may be coordinated with the deployment of other effects such as an airbag type effect. It is envisioned that the ejection will be in the vertical direction, and it will be high enough to clear a 6-foot-tall individual. These strings may also be covered in glue and or weighted at one end. So, after ejection, they will float down on T tangling limbs and clothing and causing it to stick to the first surface it lands, whether exposed skin or article of clothing.

Control Mechanism (48): According to embodiments, the deployment signal is generated when the inventive device experiences a sudden change in direction or magnitude of the velocity that exceeds pre-set threshold which results from the inventive device striking the target or if it is deflected by T. In some inventive embodiments, this is a MEMS accelerometer followed by an integrated circuit for performing post processing. This generates a signal that triggers the activation mechanism. Alternatively a proximity sensor could trigger these effects when the inventive device is a pre-set distance away from T.

Special Requirements: According to embodiments, the desired effect may be sensitive to the orientation of the inventive device as the inventive device travels to and makes contact with T. This is ensured by weighting the inventive device in such a manner that during the travel, the heavy part of the inventive device automatically rotates to be at the bottom and then the container with the mylar strings is deployed within the inventive device such that the direction of ejection is pointed away from the heavy part of the inventive device.

Power Source: According to embodiments, the energy to cause the rupture is provided by a blast cap detonation, chemically generated as in an airbag or a compressed spring being released or rapidly expanding gas from a compressed gas cylinder or chemically generated. According to embodiments, this power source is also coupled to the deployment of other effects such as an airbag.

Deployment Options: According to embodiments, the deployment may be from any direction (front, back or side). However, the landing point is preferred to be on the upper torso. The inventive device can be launched by hand if the inventive device is appropriately weighted as described before. According to embodiments, the inventive device is preloaded into a tube-like launcher with appropriate orientation assured. A tube launch is also more likely to provide better aim in selecting the contact point on the upper torso.

Use Scenario: This effect is useful for a civilian defending against a mass shooter. Once the effect is deployed, T will get entangled in the mylar tape which will lead to distraction and degradation in the target individual's ability to inflict violence.

(2) According to embodiments, the secondary effect is a slippery liquid 92 that spills on the ground and sprays isotopically to make the ground slippery to stand or walk and the weapons slippery and hard to hold or control.

Activation Mechanism: According to embodiments, the slippery liquid is contained in a bag. The bag that contains the slippery fluid is deployed inside the inventive device. Once punctured or forcefully ruptured, the fluid inside sprays within the designed radius of effectiveness.

Control Mechanism (48):

According to embodiments, the deployment signal is generated by control circuit 48 when the inventive device experiences a sudden change in direction or magnitude of the velocity that exceeds pre-set threshold which results from the inventive device striking the target or if it is deflected by T. The control circuit 48 can be a MEMS accelerometer followed by an integrated circuit for performing post processing. This generates a signal that triggers the activation mechanism. Alternatively, a proximity sensor could trigger these effects when the inventive device is a pre-set distance away from T.

Special Requirements: According to embodiments, the desired effect is not sensitive to the orientation of the inventive device as it travels to and makes contact T. If the ground is covered in carpet or other absorbing and compliant material, the slipperiness may be reduced vs a hard surface like wood, concrete or tile.

Power Source (58, 60, 62): According to embodiments, the energy to cause the rupture is provided by a blast cap detonation or a compressed spring being released or rapidly expanding gas from a compressed gas cylinder or chemically generated as in an inflating airbag. According to embodiments, this effect may also be coupled to the deployment of other effects such as an airbag.

Deployment Options: There are no requirements for specific deployment mechanism for this secondary effect. The inventive device can be hand tossed or launched from a tube. It may not even make direct contact with T and can be launched towards the feet of T. The contact point further up T will make the slippery action against the hands more effective but will have no effect on making the ground slippery.

Use Scenario: This effect can be used in almost all scenarios ranging for law enforcement personnel or homeowner defending against an intruder to a civilian defending against a mass shooter.

According to embodiments, the secondary effect 56 is an indelible Ink that sprays on the clothing and the exposed body parts of T marking and identifying T.

Activation Mechanism: According to embodiments, the bag that contains the indelible ink is deployed inside the inventive device. Once punctured or forcefully ruptured, the fluid inside sprays within the designed radius of effectiveness.

Special Requirements: This secondary effect is not sensitive to the orientation of the inventive device as the inventive device travels to and contacts T.

Power Source: According to embodiments, the energy to cause the rupture is provided by a blast cap detonation or a compressed spring being released or rapidly expanding gas from a compressed gas cylinder or chemically generated.

Deployment Options: According to embodiments, there are no requirements for a specific deployment mechanism. The inventive device can be hand tossed or launched from a tube. It may not even make direct contact with T and can be launched towards the feet of T. The contact point further up T will ensure more marking is applied to T, however, it is envisioned that the indelible ink may come into contact with T even if the inventive device does not itself come into physical contact with T.

Use Scenario: This effect is most effective for law enforcement personnel or a civilian defending against a mass shooter. Once T is marked with indelible ink, it is impossible for T to avoid detection and identification even in the chaotic aftermath of a mass shooting or when T tries to outrun the law enforcement personnel.

According to embodiments, the secondary effect 54 is a bright flashing light and/or a loud whistle that is activated and attaches itself to the clothing or the exposed body parts of T. This serves two purposes: —It marks T so the law enforcement personnel or the crowds in a mass shooting incident can track the location of T. However, if the gadgets attach themselves to the clothing of T, it is possible for T to shed the clothing reducing the effectiveness of the tracking functionality to a short time window. But the act of removing the clothing will disrupt, distract and delay T providing an opportunity for its victims to escape and for law enforcement personnel to overpower T. Furthermore, the flashing light and/or the loud sound causes a distraction, disorientation and discomfort to T degrading the target individual's ability to harm itself or others.

Activation Mechanism: According to embodiments. the bright flashing light and a loud whistle in inactivated state is deployed inside the outer envelope of the inventive device. These inventive devices are expelled forcefully from the outer envelope by using a blasting cap, compressed spring, compressed gas, or expanding gas. According to embodiments, this secondary effect is also be covered in glue causing it to stick to the first surface it contacts after being forcefully ejected from the outer envelope.

Special Requirements: This secondary effect 54 is sensitive to the orientation of the inventive device as the inventive device travels to and makes contact with T. According to embodiments, the flashing light and the loud whistle has to be expelled forcefully in the direction of travel of the inventive device. Only then it will be forced against the body or clothing of T.

Power Source: The energy to cause the rupture can be provided by a blasting cap detonation or a compressed spring being released or rapidly expanding gas from a compressed gas cylinder or chemically generated. The effect is achieved with small electronic components powered by batteries or charged capacitors.

Deployment Options: According to embodiments, this secondary effect may be deployed from any direction (front, back or side). However, the landing point is preferred to be on the upper torso. The inventive device can be launched by hand if the direction of the ejection of the flashing light and the loud whistle can be aligned with the direction of travel of the inventive device towards T. If the inventive device is preloaded into a tube-like launcher with appropriate orientation assured, that removes an additional manual step of ensuring the proper orientation before inventive device launch. A tube launch is also more likely to provide better aim in selecting the contact point on the upper torso. Accordingly, a mechanical launcher is the preferred deployment option.

Use Scenario: This effect is most useful for law enforcement personnel or a civilian defending against a mass shooter. Once the target individual is marked with a flashing light or a loud whistle, it provides instant information about the target individual's location to potential victims as well as other law enforcement personnel. Furthermore, these effects cause, distraction, disorientation, and discomfort to the target individual degrading its ability to commit violent acts.

Potential users of such a system include the members of the following non-exhaustive representative list: ordinary citizens of any age caught in the middle of a mass shooting incidence, a homeowner confronted by an intruder in the home, law enforcement officials, first responders including mental health professionals, security officials in prisons or hospitals.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A non-injurious incapacitating device comprising:

an exterior layer defining a contained volume containing therein and having a shape of a sphere, an oblate spheroid, one that is deformable and irregular, or a cube adapted to be tossed or thrown;

a primary effect consisting of a single material structure that deploys to size at least 10 times that of the contained volume;

a sensor that communicates one of a contact signal or proximity signal when said exterior layer contacts or is within an effective range of a target, respectively;

a control circuit providing a triggering signal to said primary effect based on the contact or proximity signal; and a power supply providing operating power to said primary effect, said sensor, said control circuit, or a combination thereof.

2. The device of claim 1 wherein said control circuit interconnects to said sensor with wiring internal to the contained volume.

3. The device of claim 1 wherein said power supply is external to the contained volume.

4. The device of claim 1 further comprising an arming module that prevent unintended activation of said primary effect.

5. The device of claim 4 further comprising a relay switch in electrical communication between said arming module and said control circuit.

6. The device of claim 1 wherein said primary effect is an airbag.

7. The device of claim 1 further comprising a plurality of tendrils within the contained volume.

8. The device of claim 7 wherein said plurality of tendrils are mechanically coupled to said primary effect.

9. The device of 1 further comprising an adhesive associated with said primary effect.

10. The device of claim 1 further comprising a tag configured to adhere to or mark a target individual.

11. The device of claim 10 wherein said tag is dye packet, a lachrymator packet, a smoke generation packet, or a combination thereof.

12. The device of claim 1 wherein the effective range is up to 2 meters.

13. The device of claim 1 further comprising a docking station configured to support the exterior layer.

14. A method of non-injuriously incapacitating of a target individual comprising:

a user directing a device of claim 1 into proximity of the target individual; and allowing sufficient time for said device to deploy an expansive primary effect from within the contained volume to non-injuriously incapacitate the target individual.

15. The method of claim 14 wherein the target subject is an armed assailant.

16. The method of claim 14 wherein the proximity is from physical contact to 2 meters from the target subject.

17. The method of claim 14 further comprising contacting the target subject with a secondary hindering effect from within said device.

18. The device of claim 1 further comprising a handle, a grip, or a gripping region associated with the exterior layer.

19. A non-injurious incapacitating device comprising:

an exterior layer defining a contained volume containing therein and having a shape of a cylinder adapted to be tossed or thrown;

a primary effect, prior to deployment positioned within the contained volume, consisting of a single material structure that deploys to size at least 10 times that of the contained volume;

a sensor, positioned within the exterior layer, that communicates one of a contact signal or proximity signal when said exterior layer contacts or is within an effective range of a target, respectively;

a control circuit, positioned within the contained volume, providing a triggering signal to said primary effect based on the contact or proximity signal; and a power supply, positioned within the contained volume, providing operating power to said primary effect, said sensor, said control circuit, or a combination thereof.

* * * * *